(12) United States Patent
Shin et al.

(10) Patent No.: US 12,604,113 B2
(45) Date of Patent: Apr. 14, 2026

(54) IMAGE SENSOR INCLUDING PLURAL MEMORY AREAS FOR STORING BAD PIXEL INFORMATION AND IMAGE SENSOR TEST DEVICE

(71) Applicant: SAMSUNG ELECTRONICS CO., LTD., Suwon-si (KR)

(72) Inventors: Deokha Shin, Suwon-si (KR); Dahee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 179 days.

(21) Appl. No.: 18/385,093

(22) Filed: Oct. 30, 2023

(65) Prior Publication Data

US 2024/0397222 A1 Nov. 28, 2024

(30) Foreign Application Priority Data

May 23, 2023 (KR) ........................ 10-2023-0066546

(51) Int. Cl.
H04N 25/683 (2023.01)
H04N 25/77 (2023.01)
H04N 25/78 (2023.01)

(52) U.S. Cl.
CPC ........... H04N 25/683 (2023.01); H04N 25/77 (2023.01)

(58) Field of Classification Search
CPC ...... H04N 25/77; H04N 25/683; H04N 25/68; H04N 25/78; H03M 1/001; G01R 31/2843; G01R 31/2844
See application file for complete search history.

(56) References Cited

U.S. PATENT DOCUMENTS

| | | | |
|---|---|---|---|
| 6,735,518 B2 | 5/2004 | Kim | |
| 7,601,555 B2 | 10/2009 | Kim et al. | |
| 9,762,827 B2 | 9/2017 | Cho | |
| 10,438,320 B2 | 10/2019 | Tang | |
| 2009/0135414 A1* | 5/2009 | Chang | H04N 25/68 356/237.1 |
| 2010/0034481 A1* | 2/2010 | Forutanpour | H04N 25/683 382/295 |
| 2013/0278796 A1* | 10/2013 | Ordoubadian | H04N 25/63 348/241.6 |
| 2021/0132146 A1* | 5/2021 | Tsai | G01R 31/2829 |
| 2022/0336038 A1 | 10/2022 | Park | |
| 2023/0047664 A1* | 2/2023 | Jeong | G01R 31/2889 |

(Continued)

FOREIGN PATENT DOCUMENTS

| | | |
|---|---|---|
| CN | 110727247 A | 1/2020 |
| KR | 2002-0009977 A | 2/2002 |
| KR | 10-0598381 B1 | 7/2006 |

(Continued)

*Primary Examiner* — Marly S Camargo
(74) *Attorney, Agent, or Firm* — Sughrue Mion, PLLC

(57) ABSTRACT

An image sensor test device includes: an interface configured to transmit a control signal to an image sensor to be tested; and a host device configured to transmit, to the image sensor, a storage control signal instructing to store information about a bad pixel which is determined based on an output signal of the image sensor, wherein the output signal corresponds to the control signal, and wherein the storage control signal includes a signal of instructing to store the information about the bad pixel in a memory area of a plurality of memory areas.

19 Claims, 11 Drawing Sheets

(56)                    References Cited

U.S. PATENT DOCUMENTS

2024/0053391 A1 *   2/2024  Lee ................... G01R 31/2851

FOREIGN PATENT DOCUMENTS

KR          10-0860307  B1     9/2008
KR          10-0906606  B1     7/2009
KR          10-2246873  B1     4/2021
KR     10-2022-0142879  A     10/2022

* cited by examiner

Figure 11:
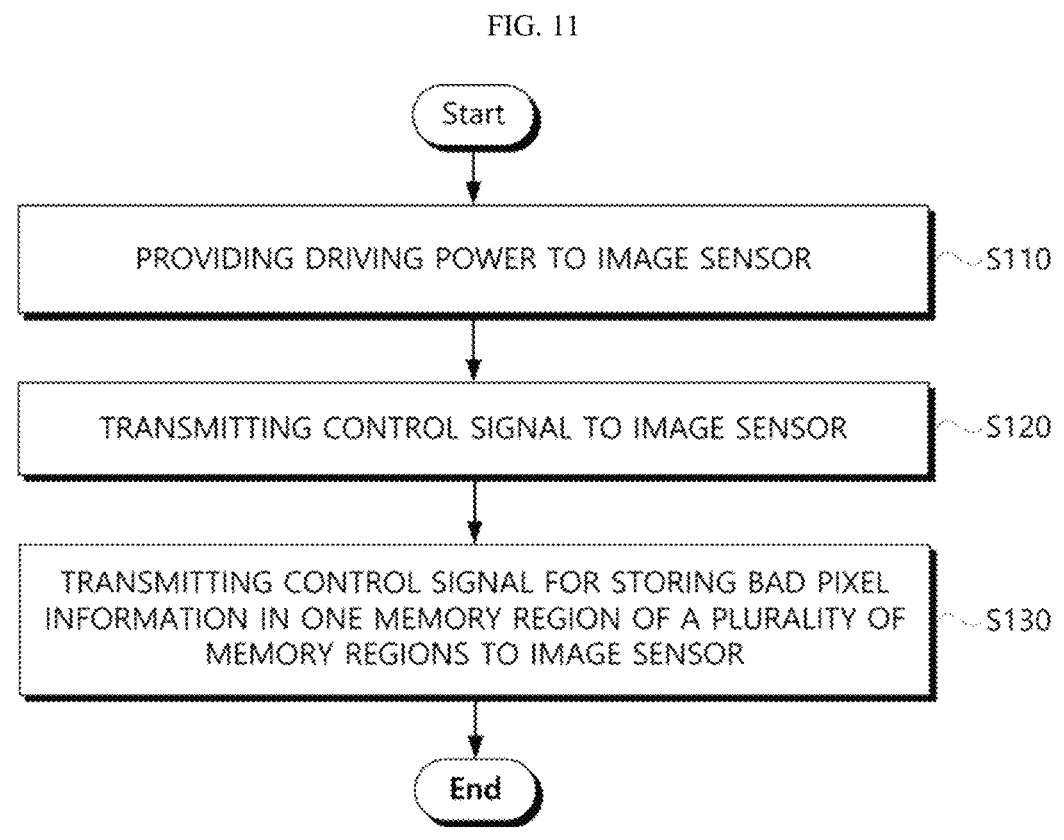

```
                    ┌─────────┐
                    │  Start  │
                    └────┬────┘
                         │
                         ▼
┌─────────────────────────────────────────────────┐
│     PROVIDING DRIVING POWER TO IMAGE SENSOR       │ ~S110
└─────────────────────────┬─────────────────────────┘
                          │
                          ▼
┌─────────────────────────────────────────────────┐
│    TRANSMITTING CONTROL SIGNAL TO IMAGE SENSOR    │ ~S120
└─────────────────────────┬─────────────────────────┘
                          │
                          ▼
┌─────────────────────────────────────────────────┐
│  TRANSMITTING CONTROL SIGNAL FOR STORING BAD PIXEL │
│ INFORMATION IN ONE MEMORY REGION OF A PLURALITY OF │ ~S130
│     MEMORY REGIONS TO IMAGE SENSOR                 │
└─────────────────────────┬─────────────────────────┘
                          │
                          ▼
                    ┌─────────┐
                    │   End   │
                    └─────────┘
```

IMAGE SENSOR INCLUDING PLURAL MEMORY AREAS FOR STORING BAD PIXEL INFORMATION AND IMAGE SENSOR TEST DEVICE

CROSS-REFERENCE TO RELATED APPLICATION

This application claims priority under 35 U.S.C. § 119 to Korean Patent Application No. 10-2023-0066546 filed on May 23, 2023, in the Korean Intellectual Property Office, the disclosure of which is incorporated by reference herein in their entireties.

BACKGROUND

1. Field

The disclosure relates to an image sensor including a plurality of memory areas for storing bad pixel information (information about a bad pixel) and an image sensor test device.

2. Description of Related Art

An image sensor is a device that converts an optical signal into an electrical signal. The image sensor includes a charge coupled device (CCD) image sensor, a complementary metal oxide semiconductor (CMOS) image sensor, and the like.

The image sensor includes a pixel array in which a plurality of pixels are arranged. Bad pixels may occur in a pixel array during a process from manufacturing an image sensor to final shipment of a camera module.

Because bad pixels may degrade image quality of an image sensor, it is necessary to correct an image signal corresponding to a bad pixel through a bad pixel correcting circuit. This is referred to as bad pixel correction. The bad pixel correcting circuit performs bad pixel correction based on location information about the bad pixel. Because such bad pixels may be related to the yield of an image sensor, a technique for effectively processing a bad pixel is required.

In related art, in an image sensor of a wafer, even after bad pixels are detected through the first electrical die sorting (EDS) test process, additional bad pixels may be generated due to external environments such as cosmic rays, and the like, or the characteristics of pixels that are normal in the initial EDS test may change and progress to additional defect pixels. A conventional image sensor and an image sensor test device cannot record additional bad pixel information when the bad pixel information is stored in the initial EDS test, so that the final yield decreases.

SUMMARY

Provided are an image sensor capable of storing information on a bad pixel additionally generated after the image sensor is tested, and an image sensor test device.

According to an aspect of the disclosure, an image sensor test device includes: an interface configured to transmit a control signal to an image sensor to be tested; and a host device configured to transmit, to the image sensor, a storage control signal instructing to store information about a bad pixel which is determined based on an output signal of the image sensor which corresponds to the control signal, and wherein the storage control signal comprises a signal of instructing to store the information about the bad pixel in a memory area of a plurality of memory areas.

According to an aspect of the disclosure, a method performed by an image sensor test device, includes: providing a driving voltage to an image sensor to be tested; transmitting a control signal to the image sensor; and transmitting, to the image sensor, a storage control signal instructing to store information about a bad pixel which is determined based on an output signal of the image sensor which corresponds to the control signal, and wherein the storage control signal comprises a signal of instructing to store the information about the bad pixel in a memory area of a plurality of memory areas.

According an aspect of the disclosure, an image sensor includes: a pixel array configured to generate a pixel signal corresponding to an intensity of incident light; a read-out circuit configured to: read the pixel signal, convert the pixel signal into a digital signal, and generate an image signal; and a bad pixel correcting circuit configured to correct at least one bad pixel in the image signal based on information about the at least one bad pixel and to output a corrected image signal, wherein the information about the at least one bad pixel comprises information obtained by reconstructing a plurality of pieces of the information about the at least one bad pixel stored in a plurality of memory areas.

The image sensor and the image sensor test device according to the disclosure may store information on bad pixels additionally generated after the image sensor is tested. Accordingly, the production yield of the image sensor may be improved.

BRIEF DESCRIPTION OF FIGURES

The above and other objects and features of the disclosure will become apparent by describing in detail embodiments thereof. In the accompanying drawings:

FIG. 11 is a flowchart illustrating a method of operating a test device according to an embodiment of the disclosure.

DETAILED DESCRIPTION

Figure 1:
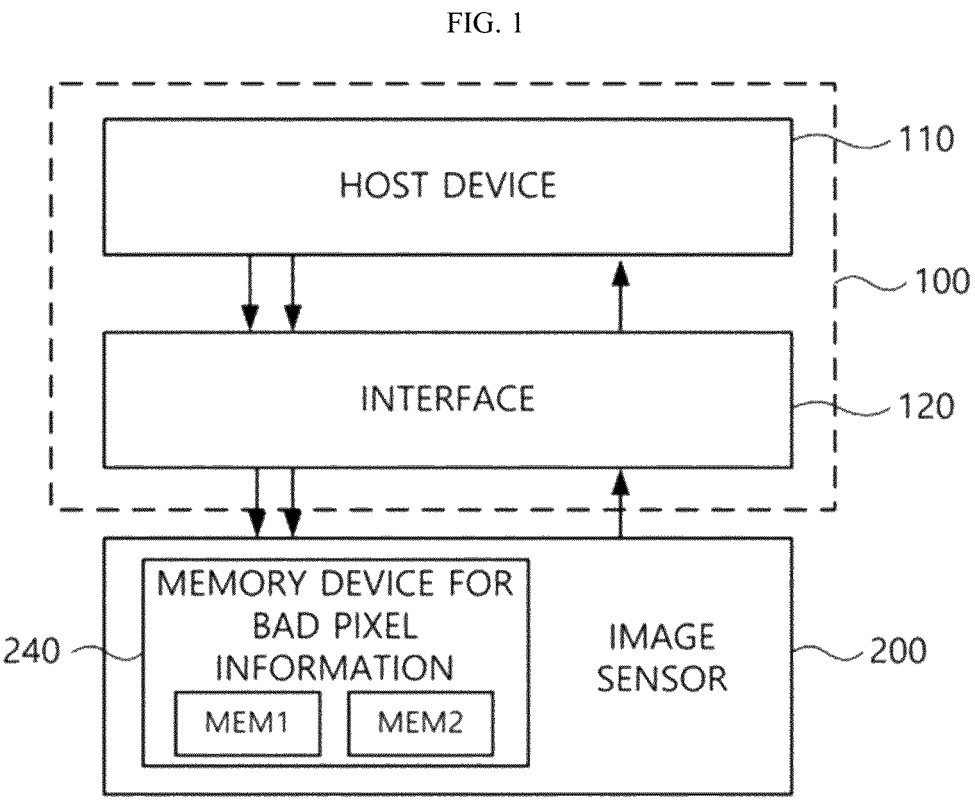
FIG. 1 is a block diagram illustrating a test device of an image sensor according to an embodiment of the disclosure.

Hereinafter, embodiments of the disclosure will be described clearly and in detail so that those skilled in the art can easily carry out embodiments of the disclosure.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Terms used in the present disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure cannot be interpreted to exclude embodiments of the present disclosure.

In one or more embodiments of the disclosure described below, a hardware approach is described as an example. However, since the one or more embodiments of the disclosure include technology that uses both hardware and software, the one or more embodiments of the present disclosure do not exclude a software-based approach.

In one embodiment, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In one embodiment, hereinafter, 'A' to B' means at least one of elements from A (including A) and to B (including B).

The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. In one embodiment, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

FIG. 1 is a block diagram illustrating a test device 100 and an image sensor 200 accommodated in the test device 100 according to an embodiment of the disclosure.

The image sensor 200 according to an embodiment of the disclosure includes a bad pixel information storage memory 240 capable of storing information on bad pixels, which has a first memory area MEM1 and a second memory area MEM2 as a plurality of memory areas. The test device 100 controls the image sensor 200 to individually store information on bad pixels detected through a plurality of tests of the image sensor 200 in the plurality of memory areas MEM1 and MEM2. The information on bad pixels found through the first test may be stored in the first memory area MEM1, and the information on bad pixels found through later tests may be stored in the second memory area MEM2. As described above, information on progressively bad pixels is individually stored in each memory area, and the image sensor 200 performs a bad pixel correction operation by using the stored information on progressively bad pixels, thereby improving the production yield of the image sensor.

In FIG. 1, the test device 100 includes a host device 110 and an interface 120.

The test device 100 may be automatic test equipment (ATE) used for electrical die sorting (EDS) of a semiconductor in a semiconductor production process or a camera module test device.

The image sensor 200 for which the test device 100 performs a test according to an embodiment of the disclosure is an image sensor before final product release. The image sensor 200 to be tested may be at least one image sensor on a wafer, an image sensor manufactured in the form of a chip package, or an image sensor included in a camera module. The image sensor 200 may be a complementary metal-oxide semiconductor (CMOS) image sensor.

In this disclosure, testing an image sensor means testing one of an image sensor of a wafer, an image sensor in a package form, and an image sensor of a camera module.

The tested image sensor 200 may be used for a personal computer (PC), an Internet-of-Things (IoT) device, or a portable electronic device. The portable electronic device may be a laptop computer, a mobile phone, a smart phone, a tablet PC, a personal digital assistant (PDA), an enterprise digital assistant (EDA), a digital camera, a digital video camera, a wearable device, or the like. In one embodiment, the tested image sensor 200 may be mounted in an image capture device of a drone, a vehicle, or the like.

A test for an image sensor includes an electrical test and an optical test. In the test of the image sensor 200 of the disclosure, light generated from a light source may be irradiated to the image sensor 200 and light responses of pixels of the image sensor 200 to the irradiated light may be tested.

The test device 100 may perform a bad pixel test of the image sensor 200 in a state in which the image sensor 200 is driven. The test device 100 may irradiate incident light to the image sensor 200 and receive an output signal corresponding to the incident light from the image sensor 200. The test device 100 may include a light source for irradiating incident light.

The test device 100 supplies a driving voltage to the image sensor 200. The test device 100 transmits a control signal to the image sensor 200 and receives an output signal of the image sensor 200 which may correspond to the control signal.

The test device 100 or a separate computer connected to the test device 100 may determine a bad pixel based on an output signal of the image sensor 200.

The interface 120 is electrically connected to the image sensor 200, which is a device under test (DUT). The interface 120 may be configured differently according to the type of the image sensor 200, which is a DUT.

In one embodiment, as described in FIGS. 4 and 5 below, the interface 120 may include an interface board 121*a* and a probe card 123*a*. In one embodiment, as described In FIG. 6, the interface 120 may include a camera module test socket 120*b* including a connection pad 125*b* for electrical signal exchange with the image sensor 200.

The image sensor 200 according to an embodiment of the disclosure includes a plurality of memory areas for storing information about a bad pixel ("bad pixel information", hereinafter). In one embodiment, the image sensor 200 includes the first memory area MEM1 and the second memory area MEM2 as the bad pixel information storage memory 240. The Information on bad pixels detected through the first test is stored in the first memory area MEM1, and the information on progressive bad pixels is stored in the second memory area MEM2.

The test device 100 according to an embodiment of the disclosure may transmit, to the image sensor 200, a control signal of instructing to store bad pixel information in one of the plurality of memory areas MEM1 and MEM2 for storing the bad pixel information. The plurality of memory areas according to an embodiment of the disclosure may be two or more memory areas. In some descriptions of the disclosure, the two memory areas MEM1 and MEM2 are described, but the embodiments are not limited thereto.

An output signal of the image sensor 200, which is a test object according to an embodiment of the disclosure, may be an image signal before information on bad pixels is stored in the plurality of memory areas MEM1 and MEM2. In one embodiment, the output signal of the image sensor 200 may be an image signal corrected based on the information on a bad pixel stored in at least one of the plurality of memory areas MEM1 and MEM2. In one embodiment, information on the bad pixels detected in the first test may be stored in the first memory area MEM1 of the bad pixel information storage memory 240. In the second test, a bad pixel is detected for an image signal corrected based on bad pixel information stored in the first memory area MEM1. Information on the bad pixels detected in the second test may be stored in the second memory area MEM2 of the bad pixel information storage memory 240. Thereafter, in the test, a bad pixel is detected for the image signal corrected based on the bad pixel information stored in all of the plurality of memory areas MEM1 and MEM2.

As described above, the image sensor 200 according to an embodiment of the disclosure includes the plurality of memory areas MEM1 and MEM2 as the bad pixel information storage memory 240 for storing information on bad pixels. The test device 100 may control the image sensor 200 to store first information on bad pixels found in the first test and second information on bad pixels found in subsequent tests in different memory areas of the bad pixel information storage memory 240. As described above, information on progressive bad pixels may be stored in a separate memory area of the image sensor 200, and the image sensor 200 may perform a bad pixel correction operation based on the information on the bad pixels including the progressive bad pixels, thereby improving the production yield of the image sensor.

Figure 2:
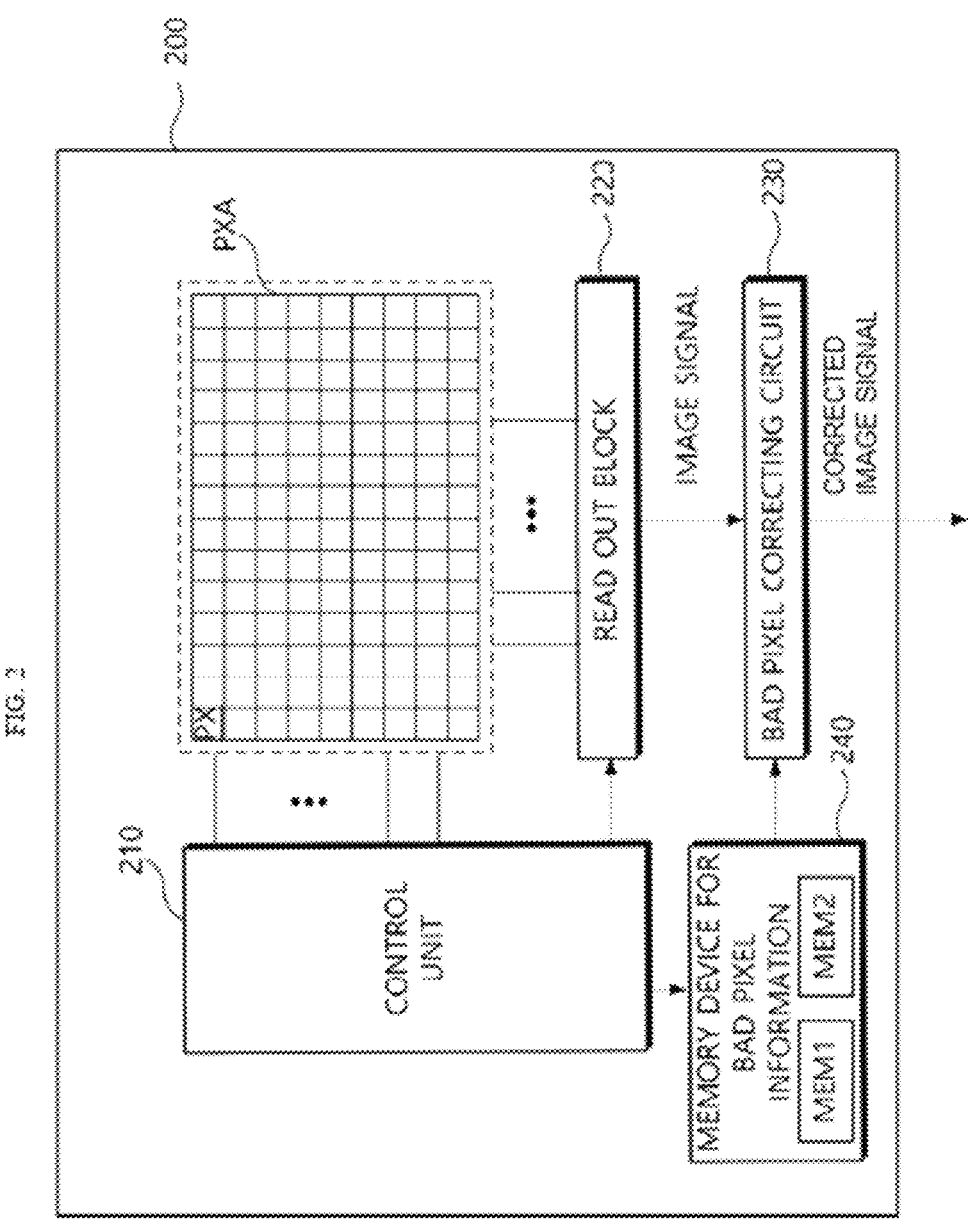
FIG. 2 is a block diagram illustrating an image sensor according to an embodiment of the disclosure.

FIG. 2 is a block diagram illustrating an example of the image sensor 200 of FIG. 1 according to an embodiment of the disclosure.

According to an embodiment of the disclosure, the image sensor 200 includes the bad pixel information storage memory 240. The bad pixel information storage memory 240 includes the plurality of memory areas MEM1 and MEM2. In the memory areas MEM1 and MEM2 of the bad pixel information storage memory 240, bad pixel information detected in a plurality of tests is separately stored. A bad pixel correcting circuit 230 of the image sensor 200 outputs an image signal corrected based on at least one piece of bad pixel information stored in each memory area MEM1 and MEM2 of the bad pixel information storage memory 240.

In FIG. 2, the image sensor 200 according to an embodiment of the disclosure is described. The image sensor 200 includes a pixel array PXA, a control unit 210, a read-out block 220, the bad pixel correcting circuit 230, and the bad pixel information storage memory 240.

The image sensor 200 may include a plurality of pixels PX, and the pixels PX may be arranged in a two-dimensional array structure to form the pixel array PXA. The pixel array PXA is formed in an active area of the substrate of the image sensor 200. Each pixel includes at least one photoelectric conversion element. The photoelectric conversion element may be a photodiode (PD). The photodiode (PD) is a type of photoelectric conversion element that generates charges in proportion to incident light irradiated from an outside and accumulates the generated charges. The photoelectric conversion element may be one of a photodiode (PD), a photo capacitor, a photogate, a pinned photodiode (PPD) and a partially pinned photodiode, a combination thereof, or the like. Although the embodiments of the disclosure are described on the premise that the photoelectric conversion element is a photodiode (PD), other photoelectric conversion elements described above may be used, but the embodiments are not limited to a photodiode (PD).

The pixel PX of the image sensor 200 includes a plurality of transistors. The plurality of transistors include a transmission transistor for transmitting charges of the photoelectric conversion element (PD), a driving transistor for outputting a voltage corresponding to the voltage of a floating diffusion region in which charges are stored, and a selection transistor SEL having one end connected to an opposite end of the driving transistor connected to a pixel power source (Vpix). The driving transistor may operate as a source follower based on a bias current generated by a current source connected to an output line (e.g., a column line). The plurality of pixels PX of the image sensor 200 may share at least a portion of the transistor described above. The pixel PX of the image sensor 200 may have a conventionally known 4T, 5T, or 6T structure.

Each pixel PX of the pixel array PXA provides a pixel signal to the read-out block 220 one at a time in units of row. The control unit 210 provides a plurality of driving signals for driving each pixels PX located in the same row to the pixel array PXA. The control unit 210 controls overall operations of the image sensor 200.

The pixels PX belonging to the selected row provide a pixel signal corresponding to incident light to the read-out block 220 through an output line of a column corresponding to each pixel.

The read-out block 220 of the image sensor 200, which is an element to be tested, converts a pixel signal of each pixel into an image signal before correction and provides the converted image signal to the bad pixel correcting circuit 230. The bad pixel correcting circuit 230 may generate and output an image signal corrected based on bad pixel information stored in the bad pixel information storage memory 240. In one embodiment, an uncorrected image signal may be generated and output even when bad pixel information exists in the bad pixel information storage memory 240. In one embodiment, the image sensor 200 driven in the EDS test and the camera module test generates and outputs an image signal corrected based on bad pixel information. However, it is not excluded that the image sensor 200 of each test generates and outputs an uncorrected image signal even when bad pixel information exists in the bad pixel information storage memory 240.

The bad pixel information referred to by the bad pixel correcting circuit 230 may be information stored in a memory in the bad pixel correcting circuit 230 by reconstructing a plurality of pieces of bad pixel information stored in the plurality of memory areas MEM1 and MEM2 of the bad pixel information storage memory 240 by the firmware of the image sensor 200.

The bad pixel information storage memory 240 according to an embodiment of the disclosure includes the plurality of memory areas MEM1 and MEM2 for storing bad pixel information. The bad pixel information stored in each memory area of the plurality of memory areas MEM1 and MEM2 may be information stored in different test operations. The bad pixel information stored in each memory area of the plurality of memory areas MEM1 and MEM2 may be stored according to instructions of different test devices in different test operations.

The corrected image signal output from the bad pixel correcting circuit 230 may be an image signal corrected based on different bad pixels according to a test operation. Because no bad pixel information exists in an operation of first testing the image sensor 200 on a wafer, the image signal may be an image signal in which the bad pixels are not substantially corrected. Then, the image signal of an additional test of the image sensor 200 of the wafer or a test of a camera module including the image sensor 200 may be a corrected image signal. In this case, the image signal of the image sensor 200 may be an image signal corrected based on bad pixel information stored in at least one of the plurality of memory areas MEM1 and MEM2 of the bad pixel information storage memory 240. The image signal of the image sensor 200 may be an image signal corrected based on bad pixel information obtained by reconstructing a plurality of pieces of bad pixel information stored in each memory areas MEM1 or MEM2.

The bad pixel information storage memory 240 according to an embodiment of the disclosure may be a memory device of a type different from that of a memory in the bad pixel correcting circuit 230. In one embodiment, the memory in the bad pixel correcting circuit 230 may be a static random access memory (SRAM) which is a volatile memory device, and the bad pixel information storage memory 240 may be a non-volatile memory device. The bad pixel information storage memory 240 may be a one-time programmable (OTP) memory, a programmable read-only memory (PROM), or an electrically erasable programmable read-only memory (EEPROM).

The plurality of memory areas MEM1 and MEM2 of the bad pixel information storage memory 240 may be configured as memory areas (of different address areas) of one memory device or may be configured as memory areas of different memory devices. When the plurality of memory areas MEM1 and MEM2 are memory areas of different memory devices, the plurality of memory devices may be memory devices of the same type or memory devices of different types. In one embodiment, one of the plurality of memory areas MEM1 and MEM2 may be an OTP memory and the other may be a PROM.

Figure 3:
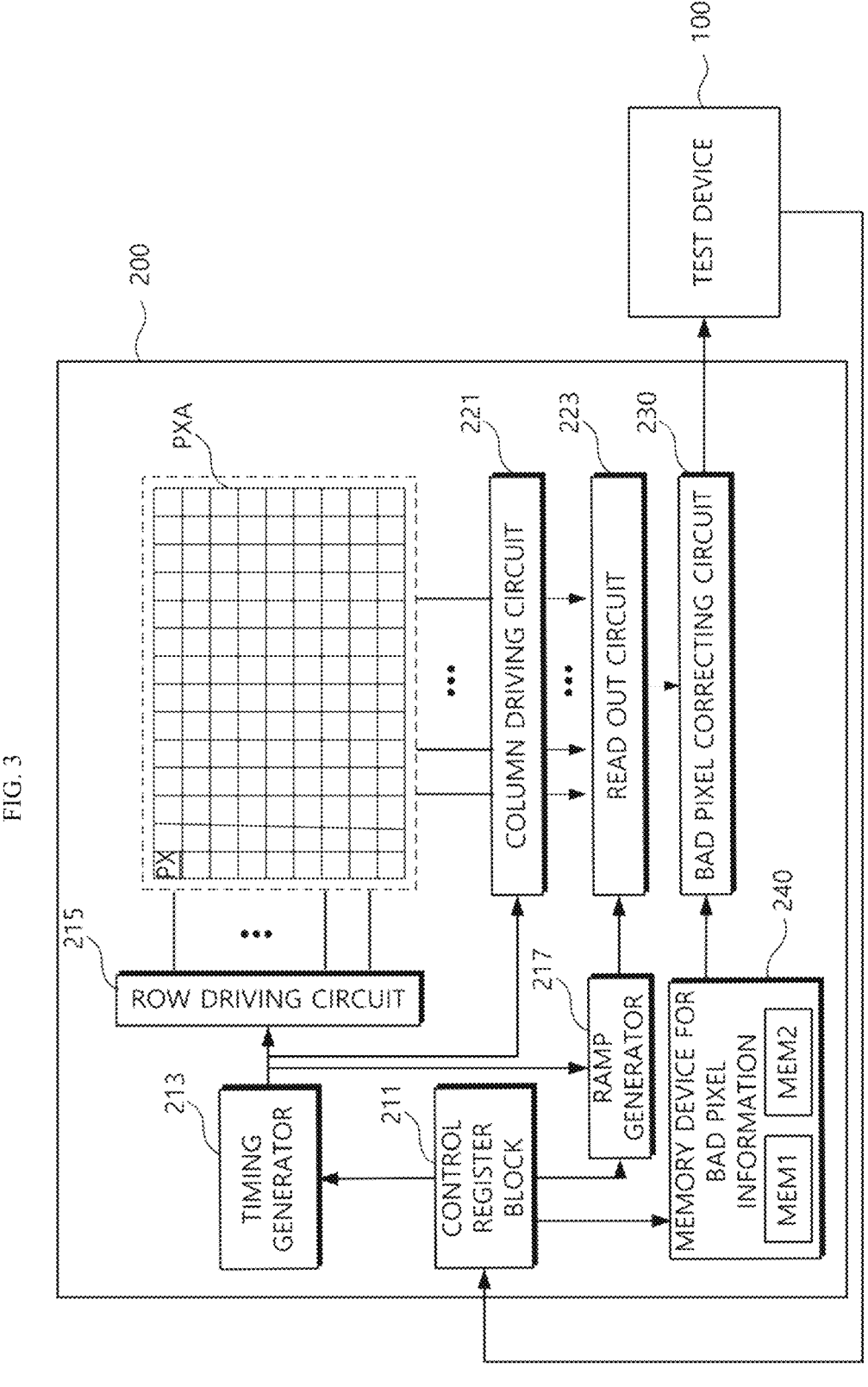
FIG. 3 is a detailed block diagram illustrating an image sensor according to an embodiment of the disclosure.

FIG. 3 is a block diagram illustrating an example of the image sensor of FIG. 2 according to an embodiment of the disclosure. The image sensor 200 according to an embodiment of the disclosure includes a bad pixel information storage memory area. The bad pixel information storage memory area includes a plurality of memory areas. The image sensor 200 receives a storage control signal of the test device 100 and stores the bad pixel information in one memory area of the plurality of bad pixel information storage memory areas 240.

In FIG. 3, the image sensor 200 according to an embodiment of the disclosure is described. The image sensor 200 includes the pixel array PXA, a control register block 211, a timing generator 213, a ramp signal generator 217, a row driving circuit 215, a column driving circuit 221, a read-out circuit 223, the bad pixel correcting circuit 230, and the bad pixel information storage memory 240. A detailed description of parts that are similar or overlapping with the description in FIG. 2 will be omitted.

The control register block 211 may control operations by outputting control signals to each of the timing generator 213, the ramp signal generator 217, and the bad pixel information storage memory 240.

The control register block 211 of the image sensor 200 under test may be controlled based on a control signal received from the test device 100. The control register block 211 may receive a storage control signal instructing to store bad pixel information from the test device 100. The storage control signal of the test device 100 may be a signal of instructing to store bad pixel information in one of a plurality of memory areas of the bad pixel information storage memory 240.

The timing generator 213 provides signals for controlling the row driving circuit 215, the ramp signal generator 217 and the column driving circuit 221 under control of the control register block 211.

The read-out circuit 223 may include a correlated double sampling (CDS) block and an analog to digital converter (ADC) block. The ADC block may perform analog-to-digital conversion of the pixel signal based on the ramp signal provided from the ramp signal generator 217.

The control register block 211 according to an embodiment of the disclosure receives a storage control signal instructing to store the bad pixel information from the test device 100. The control register block 211 outputs a control signal to the bad pixel information storage memory 240 including a plurality of memory areas in response to the storage control signal to instruct the storage of the bad pixel information.

As described above, the bad pixel information storage memory 240 includes the plurality of memory areas MEM1 and MEM2. The storage control signal of the test device 100 may be a signal of instructing to store the bad pixel information in one of the plurality of memory areas MEM1 and MEM2.

The storage control signal may include information indicating a test operation of the test device 100 or information indicating one of the plurality of memory areas MEM1 and MEM2. The storage control signal may be a signal for setting a predetermined bit in a specific register of the control register block 211. A specific register may be mapped to one of the plurality of memory areas MEM1 and MEM2.

The storage control signal may include the determined bad pixel information. The bad pixel information may be coordinates of a bad pixel in the pixel array PXA. In one embodiment, the bad pixel information may include information indicating a pattern of a bad pixel and coordinates of a representative pixel of the corresponding pattern. The pattern of the bad pixel may be information indicating one of a plurality of predefined patterns. Bad pixel information may be defined based on various schemes of storing bad pixel information.

Figure 4:
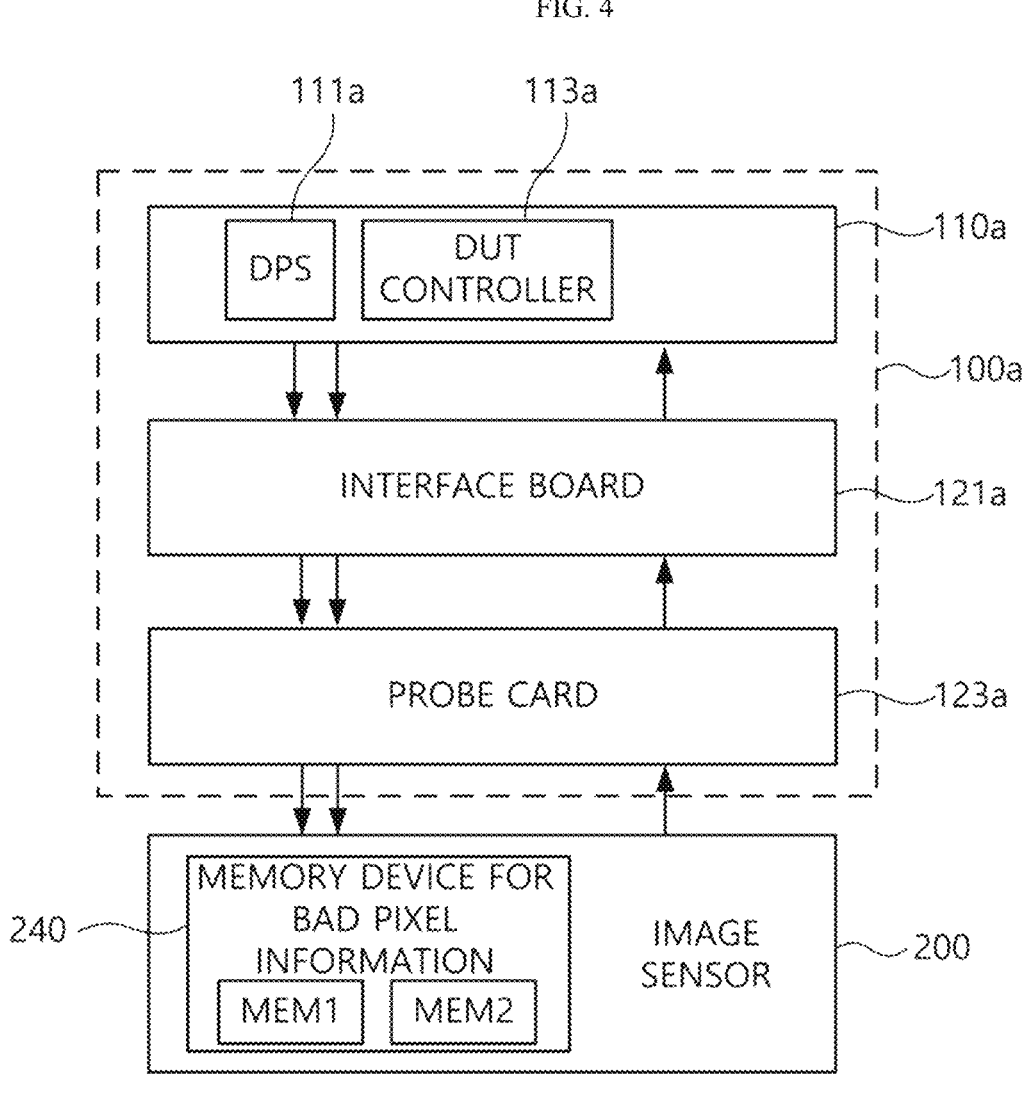
FIG. 4 is a diagram illustrating a test device of an image sensor of a wafer according to an embodiment of the disclosure.

FIG. 4 is a diagram illustrating an example of the test device of FIG. 1 according to an embodiment of the disclosure.

A test device 100a according to an embodiment of the disclosure controls the image sensor 200 of the wafer to output an image signal corresponding to incident light, and receives the image signal output from the image sensor 200. The test device 100a transmits a storage control signal instructing to store bad pixel information determined based on the image signal to the image sensor 200 of the wafer. The storage control signal is a signal of instructing the image sensor 200 to store bad pixel information in one of the plurality of memory areas MEM1 and MEM2 of the bad pixel information storage memory 240.

In FIG. 4, the test device 100a for testing an image sensor of a wafer according to an embodiment of the disclosure is described. The test device 100a of FIG. 4 may be an ATE used in an EDS process of at least one image sensor 200 of a wafer.

The test device 100a includes a host device 110a, the interface board 121a, and the probe card 123a. The host device 110a includes a device power supply (DPS) 111a and a device under test (DUT) controller 113a.

The DPS 111a is set to supply power to the image sensor 200, which is an element under test, through the interface board 121a. The power that can be supplied from the DPS 111a may vary depending on the number of DUTs and the number of test channels.

The DUT controller 113a controls the image sensor 200 which is a device under test. The DUT controller 113a transmits a control signal to the image sensor 200 through the interface board 121a and the probe card 123a such that the image sensor 200 outputs an image signal corresponding to incident light.

The DUT controller 113a according to an embodiment of the disclosure transmits a storage control signal instructing to store bad pixel information in the bad pixel information storage memory 240 of the image sensor 200 through the interface board 121a and the probe card 123a to the image sensor 200. The storage control signal may be a signal of instructing to store bad pixel information in one of the plurality of memory areas MEM1 and MEM2 of the bad pixel information storage memory 240. The storage control signal may set a predefined bit in one register of the control register block of the image sensor 200. A specific register of the control register block of the image sensor 200 may be mapped to each of the plurality of memory areas MEM1 and MEM2 of the bad pixel information storage memory 240.

The interface board 121a maps the probe card 123a and the host device 110a. The interface board 121a receives an output signal of the image sensor 200 in response to a control signal of the DUT controller 113a.

The interface board 121a may communicate with the image sensor 200 by using a mobile industry processor interface (MIPI). The communication scheme of the interface board 121a with the image sensor 200 is not limited to the MIPI. When the interface board 121a communicates with the image sensor 200 based on the MIPI, the interface board 121a may communicate with the image sensor 200 based on one of MIPI C-PHY, MIPI D-PHY, MIPI M-PHY, and MIPI A-PHY.

The interface board 121a may include a circuit that compensates for degradation or distortion of an image signal transmitted through output probes 127a and an intermediate terminal (e.g., a spring pin such as a POGO pin).

According to an embodiment, when the determining of a bad pixel is performed by a separate computer, the interface board 121a may include a communication device for transmitting an image signal to the computer that determines a bad pixel.

The probe card 123a is electrically directly connected to the image sensor 200 that is a device under test. The probe card 123a includes a plurality of probes. Probes of the probe card 123a correspond to input and output pads of the image sensor 200. The probes of the probe card 123a may be electrically connected to input and output pads of one or more image sensors 200. The probe card 123a includes an output probe for transmitting a control signal to the image sensor 200 and an input probe for receiving an output signal of the image sensor 200.

An output signal of the image sensor 200 according to an embodiment of the disclosure is an image signal that the image sensor 200 outputs in response to incident light. The image signal may be an image signal obtained by correcting the image signal that is output from the read-out circuit of the image sensor 200 by using the bad pixel information stored in the bad pixel information storage memory 240 by the bad pixel correcting circuit. The image signal may be a signal corrected by using the bad pixel information stored in the plurality of memory areas MEM1 and MEM2 of the bad pixel information storage memory 240. The image signal output from the image sensor 200 may be an image signal in which bad pixels are corrected according to whether bad pixel information is stored and a test operation, or an image signal which is output from a bad pixel information circuit and in which the bad pixel may be not substantially corrected.

The test device 100a according to an embodiment of the disclosure may test at least one image sensor 200 of a wafer a plurality of times. The test device 100a may transmit a control signal to the image sensor 200 to store the bad pixel information on the bad pixels detected in each test in the plurality of memory areas MEM1 and MEM2 of the bad pixel information storage memory 240, respectively.

In one embodiment, first bad pixel information detected in the first EDS test of the image sensor 200 may be stored in the first memory area MEM1, and second bad pixel information detected in the second EDS test may be stored in the second memory area MEM2.

According to an embodiment, the second bad pixel information may be information on a bad pixel determined based on an image signal obtained by correcting a bad pixel stored in the first bad pixel information. In one embodiment, according to the bad pixel determination scheme, the second bad information may be information on a bad pixel determined based on an image signal in which the bad pixel stored in the first bad pixel information may be not corrected.

The test device 100a according to an embodiment of the disclosure may check the test mode of the image sensor 200, and may determine a memory area to store bad pixel information among the plurality of memory areas MEM1 and MEM2 of the bad pixel information storage memory 240 based on the checked test mode. The test device 100a may transmit, to the image sensor 200, a storage control signal instructing to store bad pixel information in the memory area determined based on the test mode. The test mode may mean the number of tests.

In one embodiment, the test device 100a may transmit, to the image sensor 200, a storage control signal instructing to store the first bad pixel information detected in the first test mode of the image sensor 200 in the first memory area MEM1 among the plurality of memory areas MEM1 and MEM2. The storage control signal may be transmitted to the image sensor 200 to store the second bad pixel information detected in the re-test mode for the selected image sensor 200 in the second memory area MEM2.

In the related art, in an image sensor of a wafer, even after bad pixels are detected through the first EDS test process, additional bad pixels may be generated due to external environments such as cosmic rays, and the like, or the characteristics of pixels that are normal in the initial EDS test may change and progress to additional defect pixels. A conventional image sensor and an image sensor test device cannot record additional bad pixel information when the bad pixel information is stored in the initial EDS test, so that the final yield decreases. To the contrary, the image sensor and the image sensor test device according to an embodiment of the disclosure may store additional bad pixel information found in an additional EDS test and/or a camera module test. Accordingly, a decrease in final yield of the image sensor may be prevented.

According to an embodiment, the priorities of the plurality of memory areas MEM1 and MEM2 of the bad pixel information storage memory 240 may be set in advance. Priorities can be stored in a specific register of the image sensor. The test device 100a may determine a memory area to store bad pixel information based on priority and whether each memory area MEM1 or MEM2 is stored. In one embodiment, the image sensor may determine a memory area to store the bad pixel information in response to a signal instructing the storage of the bad pixel information of the test device. A memory area in which bad pixel information is stored or a memory area in which next bad pixel information is to be stored may be recorded in a specific register of the image sensor 200.

Figure 5:
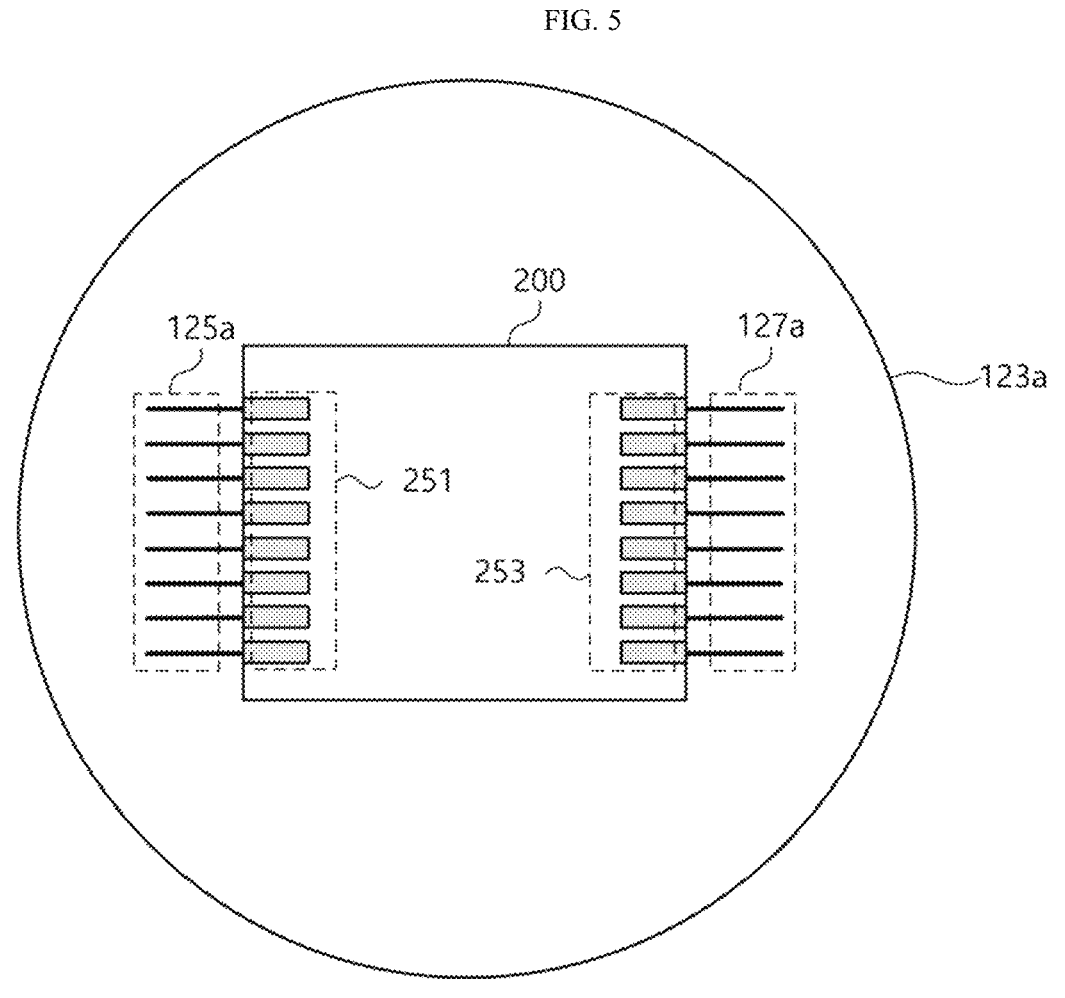
FIG. 5 is a diagram illustrating a probe card of a test device of FIG. 4 and an image sensor contained in the probe card.

In FIG. 5, the probe card 123a of the test device 100a is described.

The image sensor 200 includes a plurality of input pads 251 and a plurality of output pads 253. The plurality of input pads 251 is electrically connected to a plurality of input probes 125a of the probe card 123a, respectively. The plurality of output pads 253 is electrically connected to the plurality of output probes 127a of the probe card 123a, respectively. Each of the plurality of input probes 125a of the probe card 123a is electrically connected to the host device 110a through the interface board 121a. Each of the plurality of output probes 127a of the probe card 123a is electrically connected to the host device 110a through the interface board 121a. The image sensor 200 receives a control signal from the DUT controller 113a of the host device 110a through each of the plurality of input probes 125a of the probe card 123a. In one embodiment, the image sensor 200 transmits an image signal to the interface board 121a through the plurality of output probes 127a of the probe card 123a.

Figure 6:
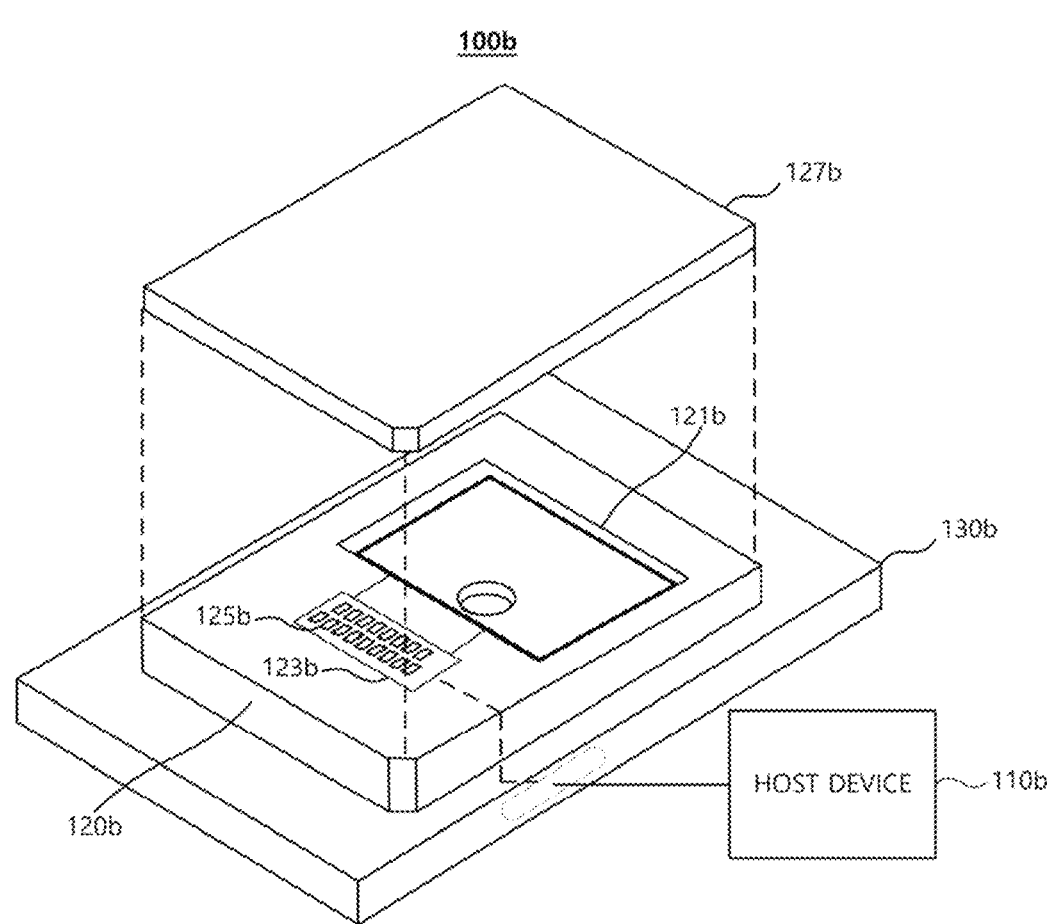
FIG. 6 is a diagram illustrating a camera module including an image sensor according to an embodiment of the disclosure.
Figure 7:
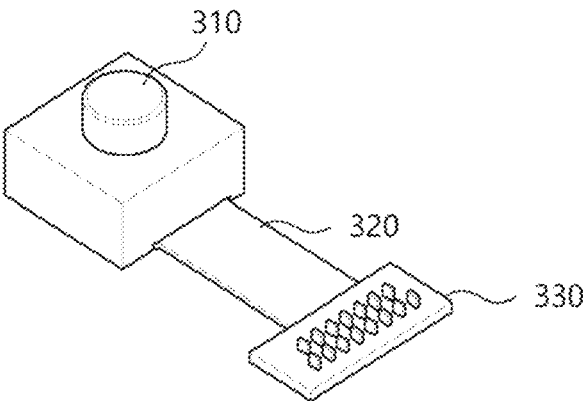
FIG. 7 is a diagram illustrating a test device and an interface of a camera module including an image sensor according to an embodiment of the disclosure.

FIGS. 6 and 7 are diagrams illustrating an example of the test device of FIG. 1 according to an embodiment of the disclosure. A test device 100b transmits a storage control signal instructing to store bad pixel information to the image sensor 200 of a camera module 300. The storage control signal is a signal of instructing to store bad pixel information in one of the plurality of memory areas of the bad pixel information storage memory 240.

In FIGS. 6 and 7, the test device 100b for testing an image sensor included in the camera module 300 according to an embodiment of the disclosure is described. The mechanical structures of the camera module 300 and the interface illustrated in FIGS. 6 and 7 are exemplary only, and do not exclude other types of mechanical structures and interfaces of the camera module and the test device.

The test device 100b may be a camera module test device used for testing the image sensor 200 included in the camera module 300.

The image sensor 200 of the camera module 300 tested by the test device 100b is a chip-packaged image sensor.

The test device 100b, which is an interface for transmitting a control signal to the image sensor 200 of the camera module 300 and receiving an output signal from the image sensor 200, includes the camera module test socket 120b and a test board 130b. The test device 100b includes a host device 110b that transmits a control signal to the image sensor 200 through the camera module test socket 120b and the test board 130b.

The camera module 300 is placed on the camera module test socket 120b to be electrically coupled to the host device 110b, and the camera module 300 transmits or receives an electrical signal through the test board 130b to which the camera module test socket 120b is connected.

After installing a light source or a test chart at a location separated by a predetermined distance from the camera module 300 of the test board 130b and photographing the light source or the test chart by the camera module 300, the test device 100b may analyze the photographed result to determine bad pixels of the image sensor 200 included in the camera module 300. In one embodiment, a separate computer may determine bad pixels of the image sensor 200 included in the camera module 300.

The test device 100b may test whether the camera module 300 operates normally, in one embodiment to whether the image sensor 200 has bad pixels. The camera module 300 may be loaded into the test device 100b while being mounted in the camera module test socket 120b.

The camera module 300 including the image sensor 200 is placed at a receiving part 121b of the camera module test socket 120b. A connector part 330 of the mounted camera module 300 is coupled to a connection part 123b of the camera module test socket 120b. A connector pin of the connector part 330 is electrically connected to the connection pad 125b of the connection part 123b. When the camera module 300 is coupled to the camera module test socket 120b, a cover 127b is closely coupled to the camera module test socket 120b.

In FIG. 7, the camera module 300 includes a lens part 310, a substrate part 320, and the connector part 330.

The connector part 330 is formed at one end of the substrate part 320 of the camera module 300. Connector pins are formed in the connector part 330.

The lens part 310 refracts the irradiated incident light and the lens part 310 transmits the refracted irradiated incident light to the image sensor 200. The image sensor 200 is mounted on the substrate part 320 and outputs an image signal corresponding to incident light. The incident light may be irradiated from a light source of the test device 100b.

The image signal output from the image sensor 200 may be transmitted to the test device 100b through a connector pin via the substrate part 320.

The host device 110*b* supplies power to the camera module 300, which is a device under test, and drives the image sensor 200 of the camera module 300. The host device 110*b* transmits a control signal to the image sensor 200 of the camera module 300 through the test board 130*b* and the camera module test socket 120*b* such that the image sensor 200 outputs an image signal corresponding to incident light.

The host device 110*b* or a separate computer according to an embodiment of the disclosure may receive the image signal output from the image sensor 200 and determine a bad pixel based on the image signal. The image signal received by the host device 110*b* from the image sensor 200 may be an image signal obtained by correcting some bad pixels of the image sensor 200. In one embodiment, the image signal received from the image sensor 200 may be an image signal that does not consider bad pixel information stored in the bad pixel information storage memory according to the bad pixel determination scheme, that is, is not corrected. Hereinafter, it is assumed that the image signal received from the image sensor 200 by the host device 110*b* is an image signal corrected based on the bad pixel information stored in the bad pixel information storage memory.

The bad pixel information storage memory of the image sensor may include a plurality of memory areas. The corrected image signal received by the host device 110*b* may be an image signal corrected based on bad pixel information obtained by reconstructing a plurality of pieces of bad pixel information stored in at least one of a plurality of memory areas. The image sensor to be tested by the test device 100*b* is described on the premise that three memory areas MEM1, MEM2, and MEM3 constitute the bad pixel information storage memory, but other embodiments are not excluded. In one embodiment, the plurality of memory areas may include two memory areas MEM1 and MEM2. Bad pixel information obtained by reconstructing a plurality of pieces of bad pixel information is described in FIG. 8.

The host device 110*b* according to an embodiment of the disclosure transmits a storage control signal instructing storage of information on the determined bad pixel (bad pixel information) to the image sensor through the test board 130*b* and the camera module test socket 120*b*.

The storage control signal of the test device 100*b* may be a signal of instructing to store bad pixel information in a memory area predetermined to correspond to a camera module test result among the plurality of memory areas MEM1 and MEM2 of the bad pixel information storage memory.

In an embodiment, the plurality of memory areas of the bad pixel information storage memory may be three or more. Among them, two memory areas may store bad pixel information determined in the first EDS test and a re-EDS test, and may store bad pixel information determined in the camera module test in the remaining memory areas. The plurality of memory areas MEM1 and MEM2 are not used as an expression limiting the number of memory areas.

The storage control signal of the test device 100*b* may be to set a control bit instructing to store bad pixel information of the image sensor 200 of the camera module 300 in a register of a control register block.

The test device 100*b* may transmit a storage control signal to the camera module 300 based on an inter-integrated circuit (I2C) protocol.

In an embodiment, the storage control signal transmitted from the test device 100*b* to the image sensor 200 may include information indicating a test mode of the camera module 300.

Figure 8:
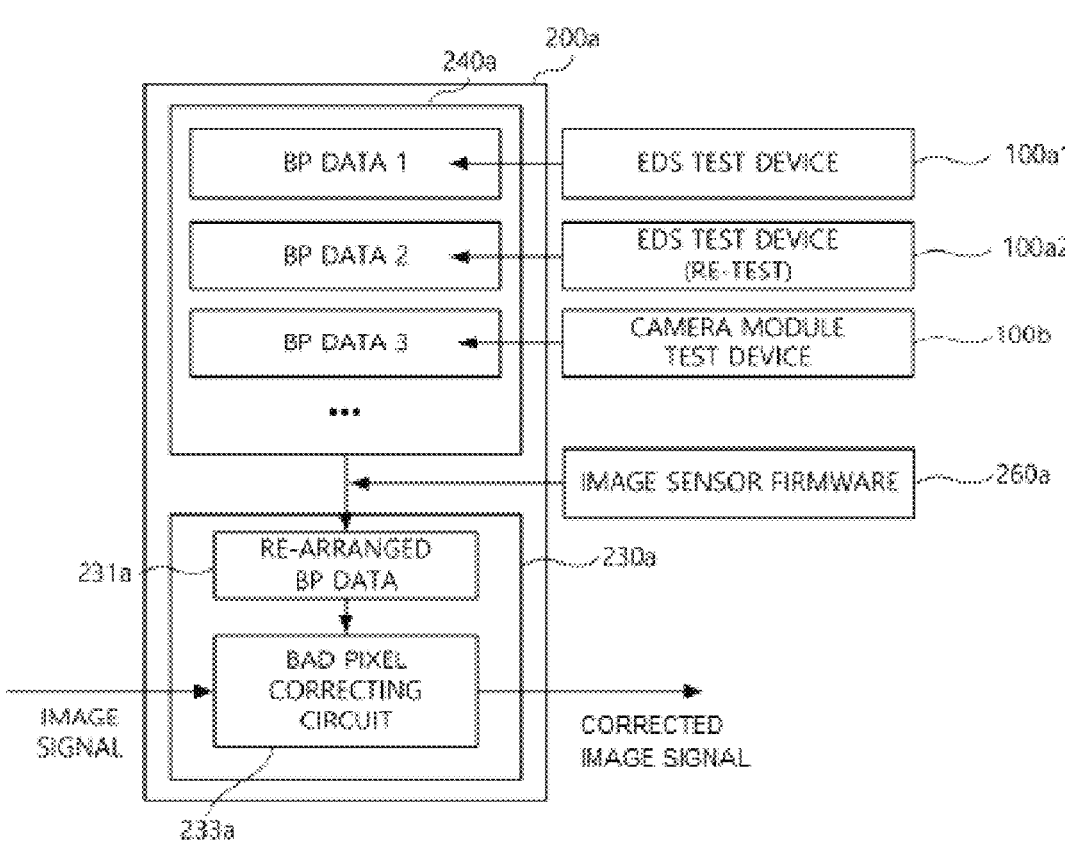
FIG. 8 is a diagram illustrating a bad pixel correction process of a bad pixel correction circuit of an image sensor according to an embodiment of the disclosure.

FIG. 8 is a diagram illustrating an example of an image sensor according to an embodiment of the disclosure. An image sensor 200*a* includes a bad pixel information storage memory 240*a* and a bad pixel correcting circuit 230*a*. The bad pixel information storage memory 240*a* includes a plurality of memory areas. The image sensor 200*a* outputs an image signal corrected based on a plurality of pieces of bad pixel information BP DATA1, BP DATA2 and BP DATA3 respectively stored in a plurality of memory areas of the bad pixel information storage memory 240*a*.

A bad pixel correction process of the bad pixel correcting circuit 230*a* of the image sensor 200*a* according to an embodiment of the disclosure is described in FIG. 8.

The image sensor 200*a* according to an embodiment of the disclosure includes the bad pixel information storage memory 240*a* in which the plurality of pieces of bad pixel information BP DATA 1, BP DATA 2, and BP DATA 3 determined from test results of a plurality of image sensors are stored. The bad pixel information BP DATA 1, BP DATA 2, and BP DATA 3 are respectively stored in a plurality of different memory areas of the bad pixel information storage memory 240*a*. Although three memory areas of the bad pixel information storage memory 240*a* are illustrated in FIG. 8, the plurality of memory areas of the bad pixel information storage memory 240*a* are not limited to three.

The plurality of memory areas of the bad pixel information storage memory 240*a* may be composed of memory areas of different address areas of one memory device or memory areas of different memory devices. When a single memory device includes different memory areas, the memory device may be a non-volatile memory device and may be an OTP memory or a PROM. The different memory devices may be the same type of memory devices or different types of memory devices. One of the different memory devices may be an OTP memory and another may be a PROM.

The bad pixel information BP DATA 1, BP DATA 2, and BP DATA 3 stored in each memory area of the bad pixel information storage memory 240*a* may be stored in different test operations. The bad pixel information BP DATA 1, BP DATA 2, and BP DATA 3 may be stored by different test devices in different test operations.

In one embodiment, the bad pixel information BP DATA 1 may be bad pixel information stored by a first test device 100*a*1 in an EDS process of an image sensor of a wafer. The bad pixel information BP DATA 2 may be bad pixel information stored by a second test device 100*a*2 in a re-examination process of an image sensor of a wafer. The bad pixel information BP DATA 3 may be bad pixel information stored by the test device 100*b* of the camera module in a test operation of the camera module. The first test device 100*a*1 and the second test device 100*a*2 may be the same test device or different test devices that test the same function.

The bad pixel information BP DATA 1, BP DATA 2, and BP DATA 3 stored in each memory area of the bad pixel information storage memory 240*a* may store information on bad pixels that do not overlap each other. In one embodiment, according to a scheme of determining a bad pixel, in another embodiment, the bad pixel information BP DATA 1, BP DATA 2, and BP DATA 3 stored in each memory area may store information on a bad pixel at least partially overlapping. The following description will be made on the premise that the bad pixel information BP DATA 1, BP DATA 2, and BP DATA 3 are information on bad pixels that do not overlap with each other.

The bad pixel information BP DATA 1, BP DATA 2, and BP DATA 3 stored in each memory area of the bad pixel information storage memory 240*a* are bad pixel information determined in an image signal corrected based on other bad pixel information according to the test order.

In one embodiment, the bad pixel information BP DATA 2 may be bad pixel information determined in an image signal corrected based on the bad pixel information BP DATA 1. The bad pixel information BP DATA 3 may be bad pixel information determined in an image signal corrected based on the bad pixel information BP DATA 1 and BP DATA 2.

The image sensor 200*a* corrects the image signal received from the read-out circuit in the bad pixel correcting circuit 230*a* to output a corrected image signal, and the image sensor 200*a* transmits the corrected image signal to an image signal processor (ISP), an application processor system on chip (AP SoC), a CPU, a GPU, and the like. The corrected image signal may be transmitted to various processors according to an electronic device.

In an embodiment, when the image sensor 200*a* is an image sensor included in a camera module, an image signal corrected based on bad pixel information BP DATA 1 and BP DATA 2 is transmitted to a test device of a camera module. The following description is made on the premise that an image sensor is installed in an electronic device.

The bad pixel correcting circuit 230*a* according to an embodiment of the disclosure corrects an image signal based on all bad pixel information BP DATA 1, BP DATA 2, and BP DATA 3 stored in the plurality of memory areas 240*a* of the bad pixel information storage memory 240*a*.

The bad pixel information, which is used by the bad pixel correcting circuit 230*a* to correct the image signal, may be bad pixel information (re-arranged BP data) obtained by reconstructing the bad pixel information BP DATA 1, BP DATA 2, and BP DATA 3 stored in the plurality of memory areas 240*a*. The re-arranged bad pixel information may be stored in the memory 231*a* within the bad pixel correcting circuit 230*a* separately from the bad pixel information storage memory 240*a*. The memory 231*a* in which the re-arranged bad pixel information is stored may be a different type of memory device from the bad pixel information storage memory 240*a*. The memory 231*a* in which the re-arranged bad pixel information is stored may be SRAM, which is a volatile memory.

A firmware 260*a* of the image sensor 200*a* according to an embodiment of the disclosure reconstructs the bad pixel information BP DATA 1, BP DATA 2, and BP DATA 3 stored in the plurality of memory areas 240*a* of the bad pixel information storage memory 240*a*, and stores the reconstructed bad pixel information in the memory 231*a* in the bad pixel correcting circuit 230*a*.

In an embodiment, the firmware 260*a* may sequentially store the bad pixels included in the bad pixel information BP DATA 1, BP DATA 2, and BP DATA 3 in the memory 231*a* based on pixel coordinates. The pixel coordinates may be based on a specific point (e.g., a left uppermost end) of a pixel array.

Figure 9:
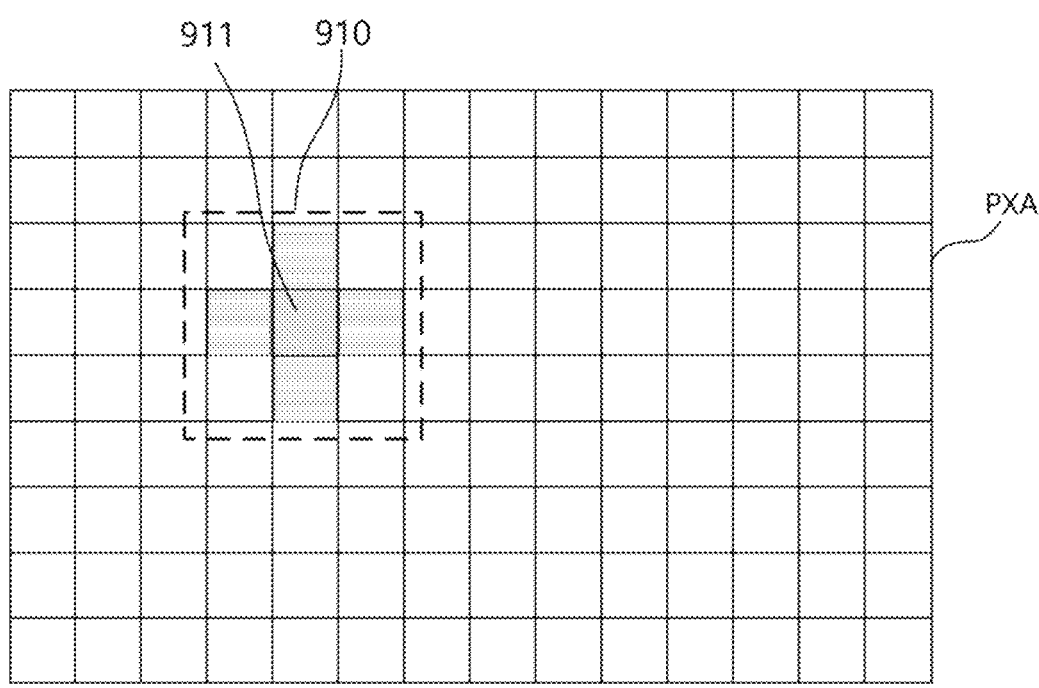
FIGS. 9 and 10 are diagrams illustrating reconstruction of bad pixel information (information about a bad pixel) of a bad pixel correction circuit of an image sensor according to an embodiment of the disclosure.

In another embodiment, the firmware 260*a* may reconstruct the bad pixel information BP DATA 1, BP DATA 2, and BP DATA 3 by applying a bad pixel pattern to the bad pixels included in the bad pixel information BP DATA 1, BP DATA 2, and BP DATA 3. In one embodiment, In FIG. 9, one bad pixel 911 may be included in the bad pixel information BP DATA 1, BP DATA 2, and BP DATA 3. The reconstructed bad pixel 910 may be a plurality of bad pixels obtained by applying a cross-shaped bad pixel pattern to the bad pixel 911. The reconstructed bad pixels 910 may be stored in the memory 231*a* based on the pixel coordinates of the reconstructed bad pixels 910 in the pixel array PXA. The type of bad pixel pattern may be stored in the bad pixel information BP DATA 1, BP DATA 2, and BP DATA 3 together with the coordinates of the bad pixel 911.

Figure 10:
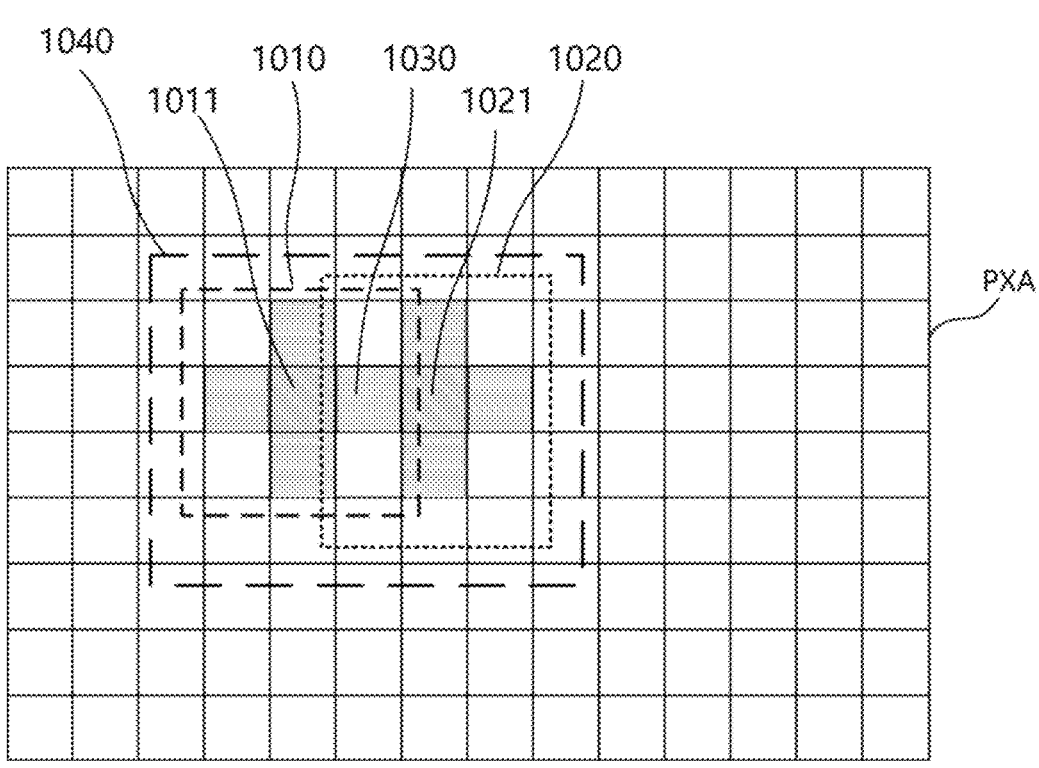

In another embodiment, after applying the bad pixel pattern to the bad pixels included in the bad pixel information BP DATA 1, BP DATA 2, and BP DATA 3, the firmware 260*a* may sort the overlapping bad pixels to reconstruct bad pixels. In one embodiment, In FIG. 10, the bad pixels included in the bad pixel information BP DATA 1, BP DATA 2, and BP DATA 3 may be bad pixels 1011 and 1021. The reconstructed bad pixels may be bad pixels 1040 in which the overlapping of bad pixels 1030 is reflected after the cross-shaped bad pixel pattern is applied to each of bad pixels 1011 and 1021. The reconstructed bad pixel 1040 may be stored in the memory 231*a* based on pixel coordinates in the pixel array PXA. The type of bad pixel pattern may be stored in the bad pixel information BP DATA 1, BP DATA 2, and BP DATA 3 together with coordinates of the bad pixels 1011 and 1021.

FIG. 11 is a flowchart illustrating a method of operating a test device according to an embodiment of the disclosure. The test device according to an embodiment of the disclosure transmits, to an image sensor, a control signal of instructing to store bad pixel information in one of a plurality of bad pixel information storage memory areas of an image sensor.

In FIG. 11, a method of operating a test device for testing an image sensor is described.

In operation S110, the test device provides a driving voltage to the image sensor. The test device may be a device for testing at least one image sensor of a wafer or a device for testing a camera module including an image sensor.

In operation S120, the test device radiates incident light to the driving image sensor based on the supplied driving voltage and the test device transmits, to the image sensor, a control signal outputting an image signal based on the incident light.

The image signal that the test device receives from the image sensor may be an image signal corrected based on the bad pixel information stored in the bad pixel information storage memory. According to an embodiment and a method of determining a bad pixel, the image signal received by the test device from the image sensor may be an image signal in which any bad pixels are not corrected.

A test device or a separate computer determines a bad pixel based on the image signal received from an image sensor.

In operation S130, the test device transmits a storage control signal instructing to store bad pixel information for the determined bad pixel to the image sensor.

The storage control signal of the test device is a signal of instructing to store bad pixel information in one of a plurality of memory areas.

The test device may instruct to store bad pixel information in a corresponding memory area according to a test mode and a test operation among a plurality of memory areas for storing bad pixel information. In this case, the test device may check the test mode or test operation.

A plurality of memory areas for storing bad pixel information may be composed of memory areas of different address areas of one memory device or may be memory areas of different memory devices.

A plurality of memory areas for storing bad pixel information may be located in a non-volatile memory device and may be an OTP memory or PROM.

According to an embodiment, priorities may be set in advance for each of the plurality of memory areas of the bad pixel information storage memory. Priorities may be stored in a specific register of an image sensor. The test device may determine a memory area to store bad pixel information based on priorities and whether bad pixel information is previously stored in each of the memory areas MEM1 and MEM2. In one embodiment, the image sensor may determine a memory area to store the bad pixel information in response to a signal of instructing to store the bad pixel information of the test device. The memory area in which bad pixel information is previously stored may be recorded in a specific register of the image sensor 200.

Specific embodiments have been described above. The disclosure may include not only the above-described embodiments, but also simple design changes or easily changeable embodiments. In one embodiment, the disclosure may include techniques that can easily modify and implement the embodiments. Therefore, the scope of the disclosure should not be limited to the above-described embodiments, but should be defined by the claims described below as well as the claims and equivalents.

What is claimed is:

1. An image sensor test device comprising:
an interface configured to transmit a control signal to an image sensor to be tested; and
a host device configured to transmit, to the image sensor, a storage control signal instructing to store information about a bad pixel which is determined based on an output signal of the image sensor which corresponds to the control signal,
wherein the storage control signal comprises a signal instructing to store the information about the bad pixel in a memory area of a plurality of memory areas in the image sensor, and
wherein the interface comprises:
a probe card configured to exchange an electrical signal with a plurality of pads of the image sensor; and
an interface board configured to receive an output signal of the probe card and to transmit the control signal to the image sensor.

2. The image sensor test device of claim 1, wherein the information about the bad pixel is determined based on the output signal of the probe card.

3. The image sensor test device of claim 2, wherein the host device is configured to check a test mode of the image sensor, and
wherein, based on the checked test mode, the host device is configured to transmit the storage control signal instructing to store the information about the bad pixel in the memory area of the plurality of memory areas.

4. The image sensor test device of claim 3, wherein the plurality of memory areas comprise a first memory area and a second memory area, and
wherein the first memory area and the second memory area have different storage priorities.

5. The image sensor test device of claim 1, wherein the image sensor comprises one of a wafer image sensor, a chip packaged image sensor, and a camera module related image sensor.

6. The image sensor test device of claim 1, wherein the memory area is located in a non-volatile memory device.

7. The image sensor test device of claim 6, wherein the non-volatile memory device comprises at least one of an one-time programmable (OTP) memory and a programmable read-only memory (PROM).

8. The image sensor test device of claim 6, wherein the memory area comprises different memory areas of one memory device or memory areas of different memory devices.

9. The image sensor test device of claim 1, wherein the plurality of memory areas comprise a first memory area and a second memory area,
wherein the first memory area is configured to store the information about the bad pixel, and
wherein the output signal of the image sensor comprises an image signal generated based on the information about the bad pixel, which is stored in the first memory area.

10. The image sensor test device of claim 1, wherein the plurality of memory areas comprise a first memory area and a second memory area,
wherein the second memory area is configured to store the information about the bad pixel, and
wherein the host device is configured to transmit the storage control signal for storing the information about the bad pixel in the second memory area.

11. The image sensor test device of claim 10, wherein the host device is configured to transmit the storage control signal instructing to store the information about the bad pixel in the second memory area when the image sensor is re-tested.

12. A method performed by an image sensor test device, the method comprising:
providing a driving voltage to an image sensor to be tested;
transmitting a control signal to the image sensor; and
transmitting, to the image sensor, a storage control signal instructing to store information of a bad pixel which is determined based on an output signal of the image sensor which corresponds to the control signal,
wherein the storage control signal comprises a signal of instructing to store the information about the bad pixel in a memory area of a plurality of memory areas areas in the image sensor, and
wherein the method further comprises:
exchanging, by a probe card, an electrical signal with a plurality of pads of the image sensor; and
receiving, by an interface board, an output signal of the probe card and transmitting, by the interface board, the control signal to the image sensor.

13. The method of claim 12, wherein the plurality of memory areas comprise different memory areas of one memory device or memory areas of different memory devices.

14. The method of claim 12, further comprising:
checking a test mode of the image sensor; and
transmitting the storage control signal instructing to store the information about the bad pixel in the memory area of the plurality of memory areas based on the checked test mode.

15. The method of claim 14, wherein the plurality of memory areas have different storage priorities.

16. An image sensor comprising:
a plurality of memory areas
a pixel array configured to generate a pixel signal corresponding to an intensity of incident light;
a read-out circuit configured to:
read the pixel signal,
convert the pixel signal into a digital signal, and
generate an image signal; and a bad pixel correcting circuit configured to correct at least one bad pixel in the image signal based on information about the at least one bad pixel and to output a corrected image signal, wherein the information about the at least one bad pixel comprises information obtained by reconstructing a plurality of pieces of the information about the at least one bad pixel stored in the plurality of memory areas, wherein the plurality of memory areas is located in a non-volatile memory device, and wherein the plurality of memory areas comprises different memory areas of one memory device or memory areas of different memory devices.

17. The image sensor of claim 16, further comprising:

a control circuit configured to:

extract the plurality of pieces of the information about the at least one bad pixel stored in the plurality of memory areas, and generate the information about the at least one bad pixel by reconstructing the extracted plurality of pieces of information about the at least one bad pixel based on pixel coordinates.

18. The image sensor of claim 16, wherein the plurality of pieces of the information about the at least one bad pixel is stored in a first memory device and a second memory device, and wherein the first memory device and the second memory device are different types.

19. The image sensor of claim 16, wherein the plurality of memory areas in which the plurality of pieces of the information about the at least one bad pixel is configured to be stored are located in a non-volatile memory device comprising at least one of a one-time programmable (OTP) memory and a programmable read-only memory (PROM).

* * * * *